May 16, 1939.    L. S. JEFFAY    2,158,626
STAND OR HOLDER FOR A PRESERVE DISH OR JAR OR LIKE CONTAINER FOR TABLE USE
Filed Sept. 27, 1938    2 Sheets-Sheet 1
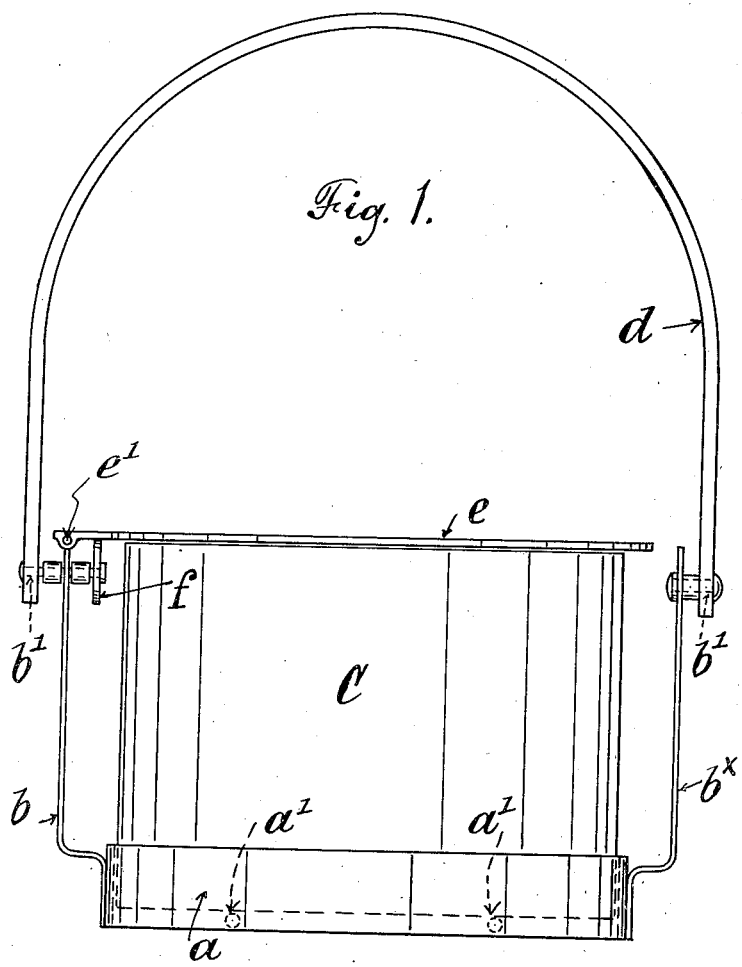
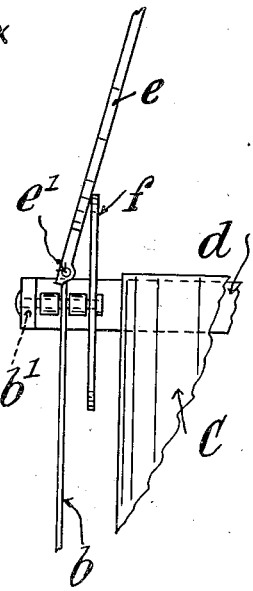
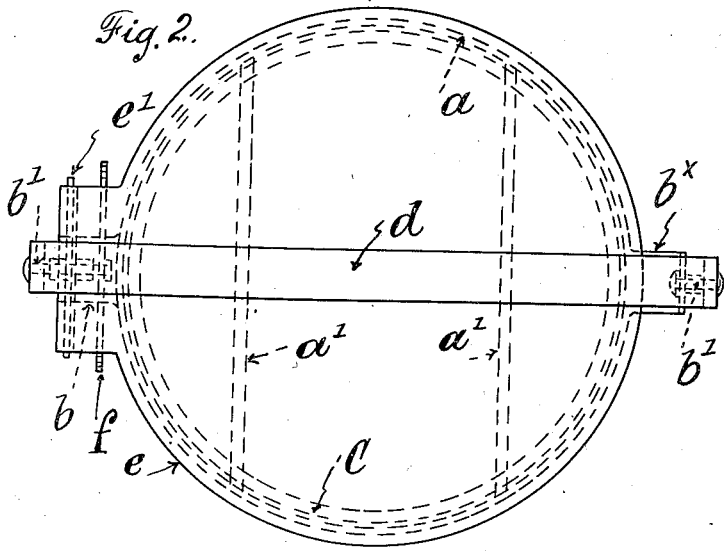
INVENTOR:
LOUIS SAUL JEFFAY
BY Francis C. Boyce
ATTORNEY May 16, 1939. L. S. JEFFAY 2,158,626
STAND OR HOLDER FOR A PRESERVE DISH OR JAR OR LIKE CONTAINER FOR TABLE USE
Filed Sept. 27, 1938 2 Sheets-Sheet 2
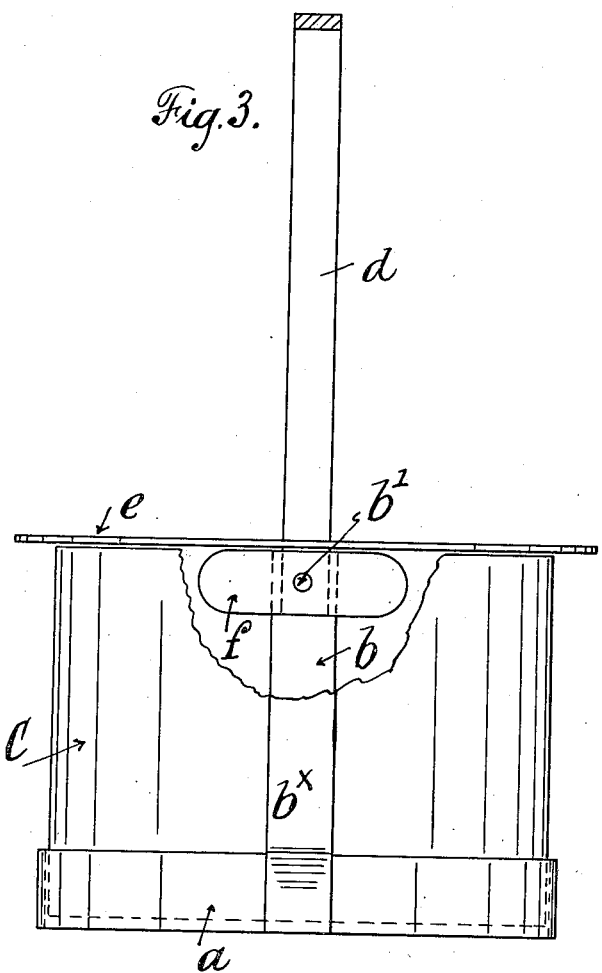
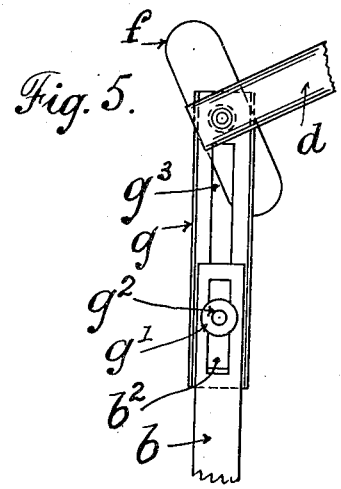
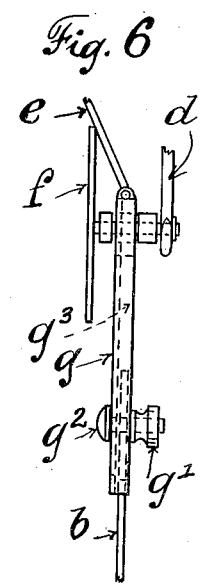
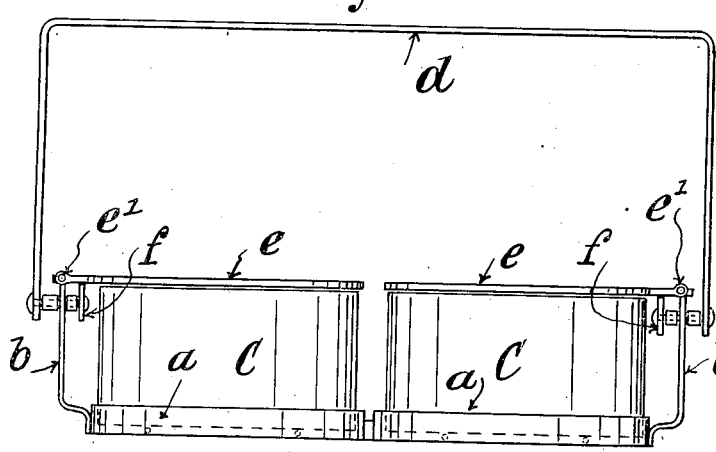
INVENTOR:
LOUIS SAUL JEFFAY
BY Francis C. Boyce
ATTORNEY Patented May 16, 1939

2,158,626

UNITED STATES PATENT OFFICE 2,158,626

STAND OR HOLDER FOR A PRESERVE DISH OR JAR OR LIKE CONTAINER FOR TABLE USE

Louis Saul Jeffay, Chorlton-on-Medlock, Manchester, England

Application September 27, 1938, Serial No. 231,856
In Great Britain October 9, 1937

3 Claims. (Cl. 65—60)

This invention relates to a stand or holder for a preserve dish or jar, butter dish, sugar or biscuit jar, or other similar container for food. The invention provides a handy device which is adapted to receive one or another of such containers (which may be interchangeable), to enable same to be lifted and carried easily, and to enable the container to be removed readily for cleaning, etc. Also the invention provides an improved stand or holder of the kind in which a lid or cover for the container is arranged to be opened and closed automatically upon movement of the handle of the stand or holder.

Accordingly the invention consists in a stand or holder of the kind above referred to for one or more preserve dishes or jars or like containers for table use, having a base structure to support and position a container and having a pivoted handle and a hinged or pivoted lid or cover which is adapted to rest normally upon the container and cover same, there being a cam device or other connection between the handle and the lid or cover whereby the turning down of the handle about its pivot acts to raise the lid or cover automatically and so uncover the container. The lid or cover is preferably arranged to move about its pivot in a direction at right angles to that in which the handle moves, and provision may be made for adjusting the height of the lid or cover to suit different depths of container. Where the invention is to be applied to a stand for holding two or more containers at a time, the construction and arrangement of parts would be suitably modified.

The invention is illustrated in the accompanying drawings, which show several arrangements by way of example.

Fig. 1 is a front view of a stand or holder for one container, Fig. 2 is a plan view thereof, and Fig. 3 is a side view with portions cut away to show the operative connection between the handle and the lid or cover.

Fig. 3a is a partial view showing the lid or cover in the raised position.

Fig. 4 shows a stand or holder for two containers.

Figs. 5 and 6 are a front and side view showing how the upright supports of the stand can be made adjustable in height to allow for different depths of container.

Referring to Figs. 1 to 3, the stand or holder is shown as having a base structure consisting of an annular socket or ring $a$ with cross-bars $a^1$ to support and position a container C. Two upright supports $b$, $b^x$ are attached to or fashioned in one with the base ring $a$ with their upper portions offset outwardly. Each of these supports $b$, $b^x$ carries at its upper end a pivot pin or stud $b^1$ upon which is fixed one end of a handle $d$, the handle $d$ normally standing upright and enabling the stand or holder to be lifted and carried about.

The upright support $b$ also has hinged to its upper end at $e^1$ a lid or cover $e$ which is adapted to swing up and down in a direction at right angles to the direction in which the handle moves. This hinge $e^1$ is arranged at such a height that when the lid $e$ is lowered the latter can rest flat upon the top of the container C as shown to cover it properly. To ensure this, the hinged connection can be loose or have some power of accommodation. The pivot pin or stud $b^1$ in the upright support $b$ has fixed on its inner end a double cam device $f$ shaped and arranged as shown so that, when the handle $d$ is swung downwards to either side, the cam $f$ acts on the underside of the lid $e$ close to the hinge $e^1$ and raises the lid to the position shown in Fig. 3a so as to give ready access to the container. Preferably, the lid $e$ is not moved far enough to reach a vertical position so that, when the handle $d$ is swung back into its upright position, the lid can fall by its own weight, and this can be ensured by means of a stop or abutment, such as the slightly projecting rear end of the hinged portion of the lid $e$.

By reason of the upright supports $b$, $b^x$ having their upper portions offset, the cam $f$ does not project inwardly sufficient to obstruct the ready insertion and removal of the containers.

Provision would be made for leaving a spoon or the like in the container, as by a gap cut out of the upper rim of the container C (or of the edge of the lid $e$), so that the lid can lie flat and properly close the container.

Fig. 4 shows one form of stand or holder for two containers. The construction is similar to that described above, except that the base structure has two rings $a$ connected rigidly together and each upright support $b$, $b$ carries a hinged lid $e$ and operating cam $f$. With this arrangement, movement of the handle $d$ to either side automatically raises both lids $e$, so that, for example, a choice of two kinds of preserve is available.

In the construction shown in Figs. 5 and 6, the upright support $b$ has a slot $b^2$ at its upper end, and an extension piece $g$ of channel section fits slidably against the support $b$ and can be clamped in varying position by a knurled nut $g^1$ on a screwed stud $g^2$ passing through the slot $b^2$ and a slot $g^3$ in the extension piece $g$. This extension piece $g$ carries at its upper end the hinged lid $e$ (not shown in Fig. 5) and the pivoted handle $d$ and cam $f$ as previously described. The other upright support $b^x$ (in the case of the single form of stand or holder shown in Figs. 1 to 3) would have a similar extension piece with adjusting nut $g^1$. Thus, by slackening the nuts $g^1$ and extending or contracting the upright supports, the lid $e$ can be moved vertically through a considerable distance to enable it to close properly upon the tops of containers of varying depths.

The stand or holder according to the invention is of simple construction and made to look very attractive, it is readily handled, the lid is easily raised but cannot be dropped or left lying about, and different containers can be placed in the stand or holder so that it can be put to many uses.

I declare that what I claim is:

1. A stand for preserve dishes and jars and like containers for table use, comprising in combination a base structure to support and position a readily removable container, upright supports connected to said base structure, a hinged lid attached to one of said upright supports and arranged to rest normally upon the top of said container to cover same, a pivoted handle mounted on said upright supports, a cam device operated by said pivoted handle and arranged to act upon the hinged lid adjacent the hinge and to raise said lid automatically when said handle is turned down about its pivot, and vertically adjustable extension pieces with clamping means mounted on the upper ends of said upright supports and carrying the hinged lid and pivoted handle and cam device.

2. A stand for preserve dishes and jars and like containers for table use, comprising in combination a base structure for a container, two upright supports fixed thereto having their upper portions offset outwardly, a hinged lid mounted on the top of one such upright support and arranged to rest normally upon the top of said container to cover same, a pivoted handle mounted near the tops of said upright supports so as to move in a direction at right angles to that in which the hinged lid moves, and a double cam device operated by said pivoted handle and arranged to act upon the hinged lid adjacent the hinge and to raise said lid automatically when said handle is turned down on either side about its pivot.

3. A combination as claimed in claim 2, wherein the tops of said upright supports comprise separate extension pieces which are vertically adjustable on said supports by means of slots and locking devices and one of which carries the lid and cam device as well as one end of the handle.

LOUIS SAUL JEFFAY.